United States Patent [19]

Kikugawa

[11] Patent Number: 4,959,601
[45] Date of Patent: Sep. 25, 1990

[54] DRIVING DEVICE FOR A STEPPING MOTOR

[75] Inventor: Noriyuki Kikugawa, Kawasaki, Japan

[73] Assignee: Canon Kabushiki Kaisha, Tokyo, Japan

[21] Appl. No.: 309,481

[22] Filed: Feb. 13, 1989

[30] Foreign Application Priority Data

Feb. 23, 1988 [JP] Japan .................................. 63-038531

[51] Int. Cl.⁵ .............................................. H02P 8/00
[52] U.S. Cl. ...................................... 318/696; 318/685; 318/599; 318/341; 363/124; 363/74; 363/25
[58] Field of Search ............... 318/696, 685, 599, 341; 363/124, 74, 25

[56] References Cited

U.S. PATENT DOCUMENTS

| | | | |
|---|---|---|---|
| 4,336,484 | 6/1982 | Marimko | 318/696 |
| 4,495,455 | 1/1985 | Araki | 318/696 |
| 4,661,882 | 4/1987 | Presley | 361/159 |

Primary Examiner—William M. Shoop, Jr.
Assistant Examiner—Saul M. Bergmann
Attorney, Agent, or Firm—Fitzpatrick, Cella, Harper & Scinto

[57] ABSTRACT

In a driving circuit for a stepping motor in which a phase current corresponding to a predetermined reference voltage is generated when an excitation signal for each phase of the stepping motor is being produced and a coil of the corresponding phase is excited by the phase current, the supply time of the phase current is controlled by the pulse signal of a pulse generator for varying the pulse width, thereby improving the rising state of the phase current.

3 Claims, 6 Drawing Sheets

FIG.3(a) SYSTEM CLOCK
FIG.3(b) CK
FIG.3(c) OUTPUT OF 221
FIG.3(d) OUTPUT OF 222
FIG.3(e) OUTPUT OF 224

FIG.3(f) CK
FIG.3(g) OUTPUT OF 224
FIG.3(h) VALUE OF UP-COUNTER 225 / VALUE OF PWM REGISTER 227
FIG.3(i) OUTPUT OF COMPARATOR 226 (PWM OUTPUT)

DRIVING DEVICE FOR A STEPPING MOTOR

BACKGROUND OF THE INVENTION

1. Field of the Invention

This invention relates to a driving device for a stepping motor.

2. Related Background Art

A constant current chopper driving circuit of good efficiency has heretofore often been used as a driving circuit for a stepping motor. An example of it will hereinafter be described with reference to FIG. 6 of the accompanying drawings.

Figure 6:
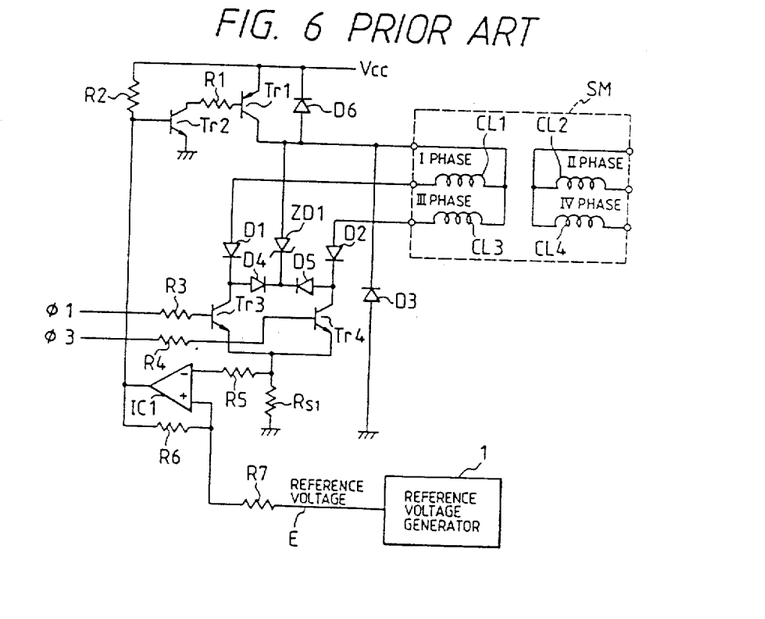
FIG. 6 is a circuit diagram showing an example of the prior art.
Figure 7A:
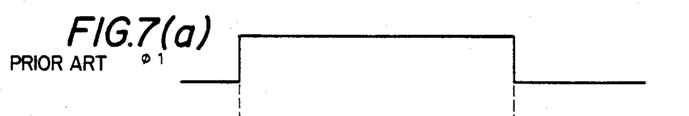
Figure 7B:
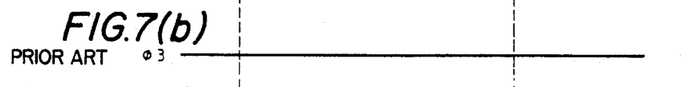
Figure 7C:
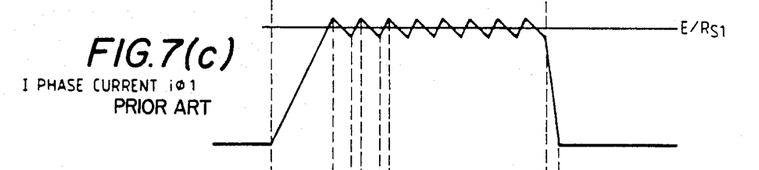
Figure 7D:
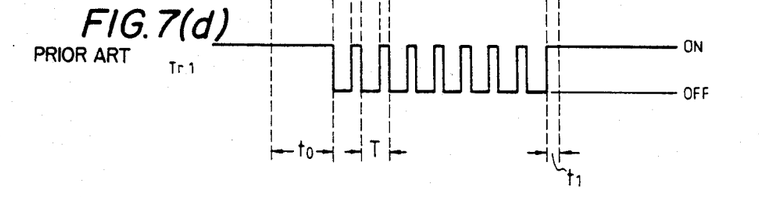

FIG. 6 shows an example of a driving circuit for a 4-phase stepping motor SM, and in view of the fact that a driving circuit on I and III phase coils CL1 and CL3 side is entirely the same as a driving circuit on II and IV phase coils CL2 and CL4 side, this figure shows only the circuit arrangement on the I and III phase side.

In FIG. 6, Tr1 and Tr2 designate phase current chopper transistors for the I phase coil CL1 and the III phase coil CL3 of the stepping motor SM. Tr3 and Tr4 denote transistors which are supplied with phase excitation signals $\phi 1$ and $\phi 3$ for the I and III phase coils CL1 and CL3 and control the ON and OFF of the excitation current for these coils CL1 and CL3.

D1 and D2 designate diodes for preventing the backward flow of the excitation current, and D3 denotes a diode for feeding back the current when the chopper transistor Tr1 is turned off, as will be described later. Diodes D4 and D5 and Zener diode ZD1 are diodes for protecting the transistors Tr3 and Tr4 and a diode D6 is a diode for protecting the transistor Tr1.

R1-R7 designate resistors. The detection voltage of a phase current detecting resistor $R_{S1}$ connected between the common emitter of the transistors Tr3 and Tr4 and a common potential is applied to the negative input terminal of a comparator IC1 through the resistor R5. An output reference voltage E from a reference voltage generator is applied to the other positive input terminal of the comparator IC1 through the resistor R7. The resistor R6 is connected between this positive input terminal and the output terminal of the comparator.

Further, the output terminal of the comparator is connected to the base of the transistor Tr2 and the resistor R2, and the collector of the transistor Tr2 is connected to the base of the transistor Tr1 through the resistor R1.

The reference voltage generator 1 comprises a D/A digital to analog converter, and D/A-converts the reference voltage indication by a digital signal from a microprocessor, not shown, and outputs the reference voltage E.

Vcc denotes a power source voltage.

Assuming that of the phase excitation signals $\phi 1$ and $\phi 3$ corresponding to the I phase and the III phase, the signal $\phi 1$ has come, the transistor Tr3 is biased thereby through the resistor R3 and conducts, and a phase current flows through the route of Tr1→CL1→D1→Tr3→$R_{S1}$. This phase current rises at a certain time constant by the inductance load of the I phase coil CL1.

When the potential across the detecting resistor $R_{S1}$ produced by this phase current reaches the reference voltage E, the output of the comparator IC1 assumes a low level, and the transistor Tr2 so far biased by the resistor R2 becomes non-conductive. As a result, the transistor Tr1 also becomes nonconductive.

At this time, the phase current flows through the route of D3→CL1→D1→Tr3→$R_{S1}$ by energy stored in the I phase coil CL1, but as the energy of the I phase coil CL1 is consumed, the phase current decreases and the potential across the detecting resistor $R_{S1}$ also falls. When the potential across the detecting resistor $R_{S1}$ falls below the reference voltage E, the output of the comparator IC1 becomes a high impedance, and the transistors Tr2 and Tr1 conduct again and the phase current flow through the route of Tr1→CL1→D1→Tr3→$R_{S1}$.

By the repetition of the above-described process, the phase current $i_1$ of I phase is chopped by the transistors Tr1 and Tr2 during the period of production of the I phase excitation signal $\phi 1$ and becomes a constant current $i_{\phi 1} = E/R_{S1}$. This state is shown in FIG. 7 of the accompanying drawings.

Actually, the circuit shown in FIG. 6 has a hysteresis determined by the resistors R6 and R7 and a delay of a feedback loop and therefore, the I phase current $i_{\phi 1}$ becomes a "sawtooth wave" as shown in FIG. 7. The period indicated by $t_1$ in FIG. 7 is a period during which the energy stored in the I phase coil CL1 after the transistor Tr3 has become non-conductive flows through the route of CL1→D1→D4→ZD1.

However, in the example of the prior art shown in FIGS. 6 and 7, the rising period $t_0$ (see FIG. 7) of the I phase current $i_1$ is $$i_{\phi 1} = \frac{V_{cc}}{R_{L1} + R_{S1}} \cdot \{1 - e^{-\frac{(R_{L1}+R_{S1})}{L}t}\}$$

(where $R_{L1}$ and $L_1$ are indicative of the winding resistance and inductance, respectively, of the I phase coil CL1), and the manner of rising of the I phase current $i_{\phi 1}$ depends on the power source voltage Vcc.

As a result, in a system wherein the rising of the phase current i becomes steep due to the relation between the power source voltage Vcc and the winding resistance and inductance of the stepping motor SM, there has been the disadvantage that the ripple of the torque produced during the rotation of the stepping motor SM, particularly during the change-over of the phase, becomes great and the noise produced from the stepping motor SM becomes great.

Also, in the aforedescribed example of the prior art, the switching period T of the chopper transistor Tr1 shown in FIG. 6 becomes great depending on the system, and this also has led to the disadvantage that the chopper frequency (1/T) enters into the audible range to cause discordant noise.

SUMMARY OF THE INVENTION

In view of the above-noted points, it is an object of the present invention to provide a driving device designed to minimize the production of noise from a stepping motor.

The present invention further proposes a driving device for a stepping motor designed to control the conduction of the chopper transistors of the stepping motor by pulse generator means capable of making the pulse width variable.

The present invention still further proposes a novel driving device for a stepping motor in which a pulse width modulator-PWM control unit for varying the duty ratio of the pulse width for controlling the supply time of a phase current to a coil is connected to a coil exciting circuit and the supply of said phase current is controlled by a data signal for varying the pulse width from an external control system, for example, a microprocessor for controlling the operation of the stepping motor.

BRIEF DESCRIPTION OF THE DRAWINGS

FIGS. 3(a)-3(l) show the output wave forms of the essential portions of the FIG. 2 circuit.

FIGS. 4(a)-4(e) illustrate the output wave forms and operations of the essential portions of the circuit shown in FIG. 1.

FIGS. 8(a)-7(d) illustrates the operation of the example of the prior art.

DESCRIPTION OF THE PREFERRED EMBODIMENTS

Figure 1:
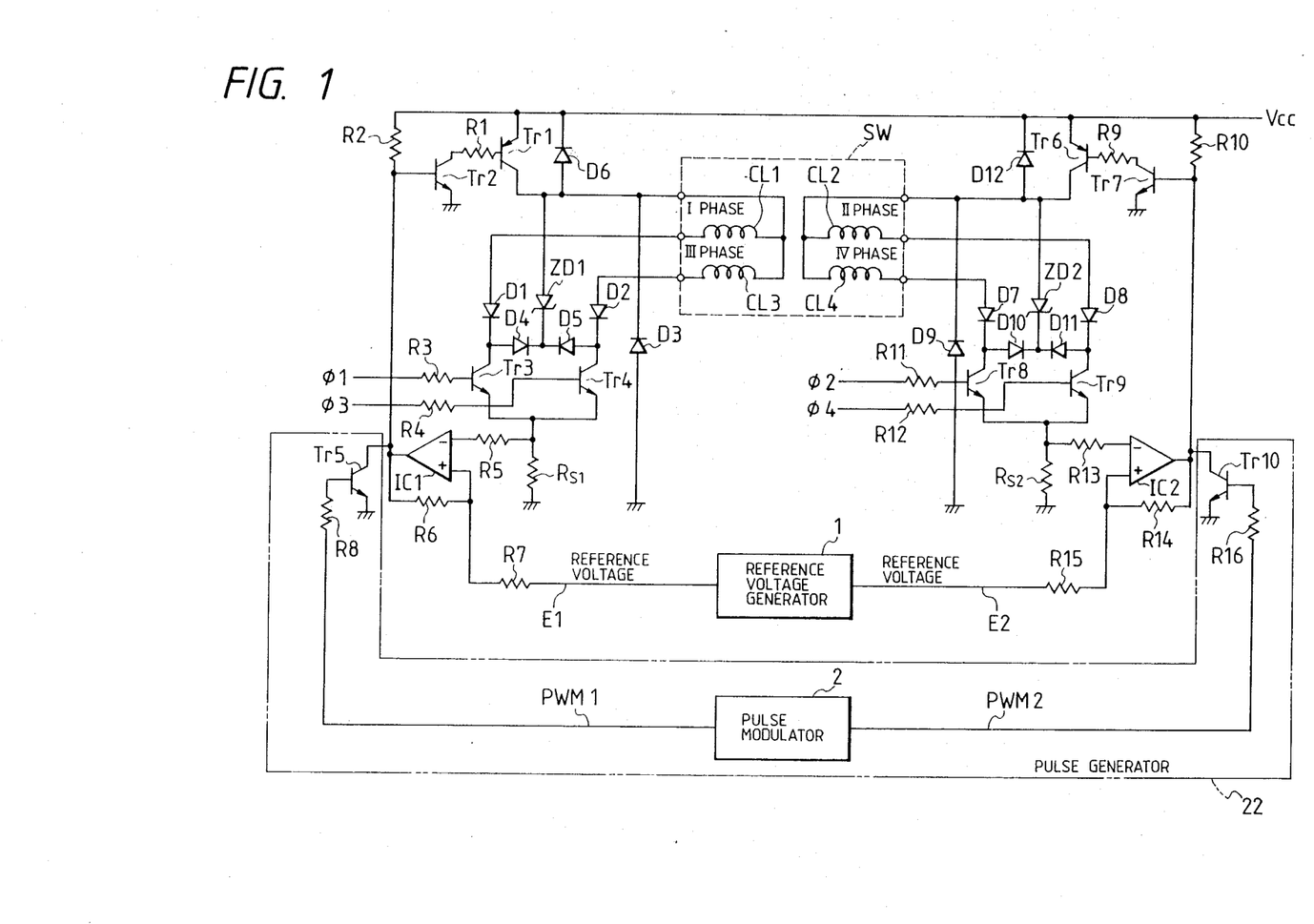
FIG. 1 is a circuit diagram showing an embodiment of the present invention.

FIG. 1 shows a driving circuit for a 4-phase stepping motor as an embodiment of the present invention. In FIG. 1, there are shown driving circuits for all of 4-phase coils CL1-CL4, and the corresponding portions of the driving circuits on I and III phase side shown in FIG. 6 (prior art) are given similar reference numerals. Also, in the driving circuits on II and IV phase side, transistors Tr6-Tr9 correspond to Tr1-Tr4, diodes D7-D12 correspond to D1-D6, a Zener diode ZD2 corresponds to ZD1, resistors R9-R15 correspond to R1-R7, and a comparator IC2 corresponds to IC1.

In the present embodiment shown in FIG. 1, unlike the example of the prior art shown in FIG. 6, there is added pulse generator means 22 having a pulse modulator 2, transistors Tr5 and Tr10 and resistors R8 and R16, and except for this portion, the circuit arrangement of FIG. 1 is similar to the example of the prior art shown in FIG. 6. Consequently, description of the similar portions will be omitted and this added portion will hereinafter be described in detail.

Figure 2:
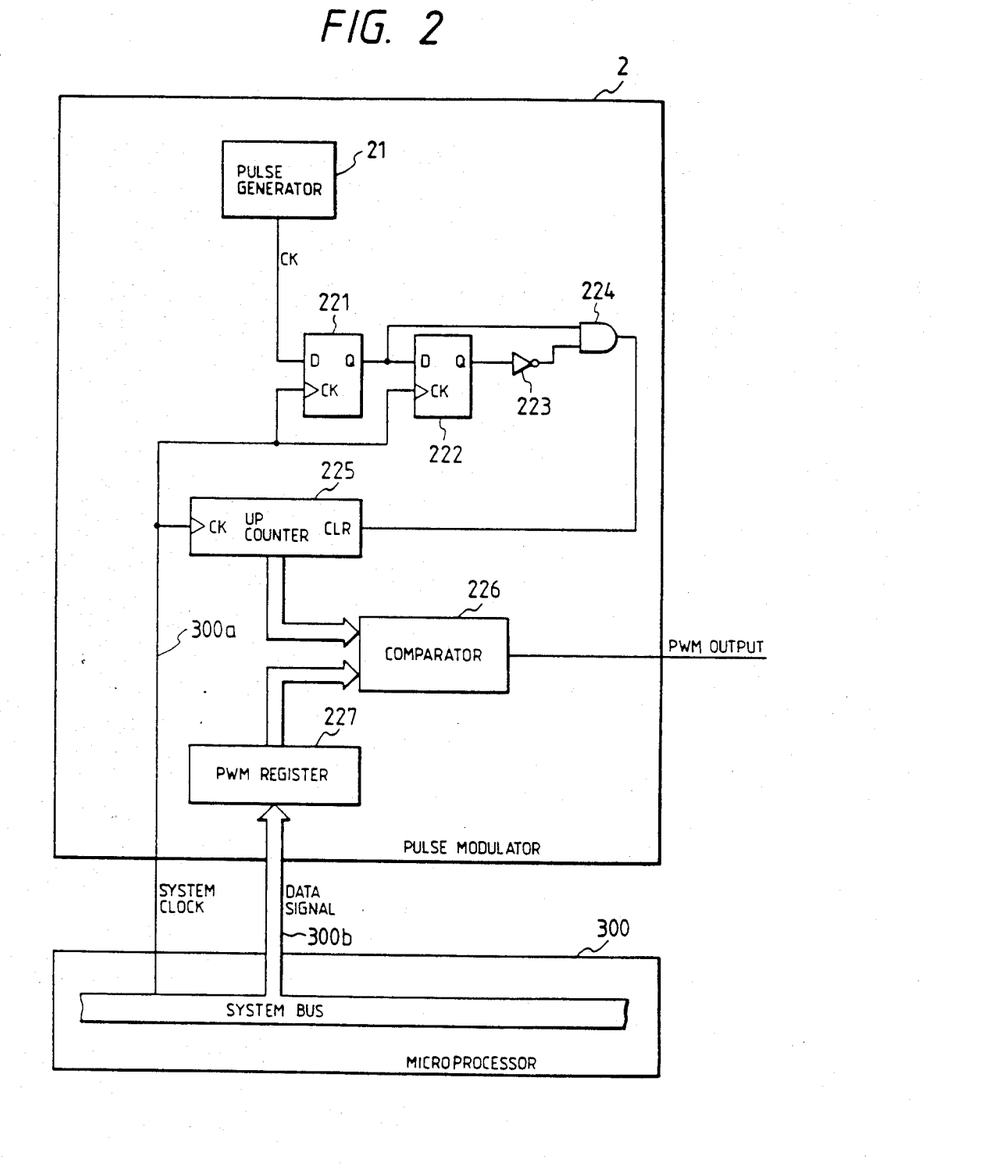
FIG. 2 is a circuit diagram of the pulse modulator of the present invention.

FIG. 2 is a circuit diagram showing an example of the pulse modulator means 2. The pulse modulator means 2 comprises a pulse generator 21 outputting a clock pulse CK of a frequency outside the audible range (of the order of 20 kHz–30 kHz) and a circuit adapted to be triggered by the output clock pulse.

FIG. 2 shows the circuit construction of the pulse modulator means 2 outputting a modulated pulse signal in response to a signal from a microprocessor 300, and FIG. 3 shows the output wave forms of the various portions of FIG. 2. In FIG. 2, the reference numerals 221 and 222 designate D type flip-flops. The flip-flop 221 receives as inputs a system clock signal on a line 300a (FIG. 3(a)) from the microprocessor 300 and the clock pulse CK (FIG. 3(b)) of the pulse generator 21, and outputs a wave form shown in FIG. 3(c). The flip-flop 222 receives the output wave of the flip-flop 221 as an input and outputs an output wave shown in FIG. 3(d) in synchronism with the system clock signal on the line 300a.

Figure 3A:
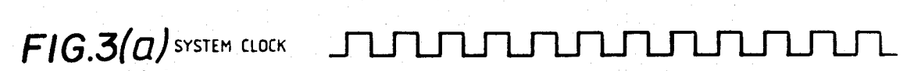
Figures 3B, 3C, 3D:
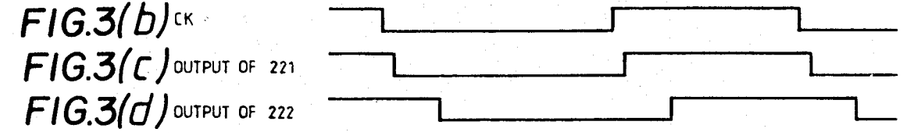
Figure 3E:
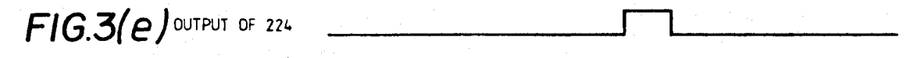
Figure 3F:
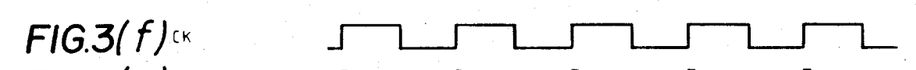
Figures 3G, 3H:
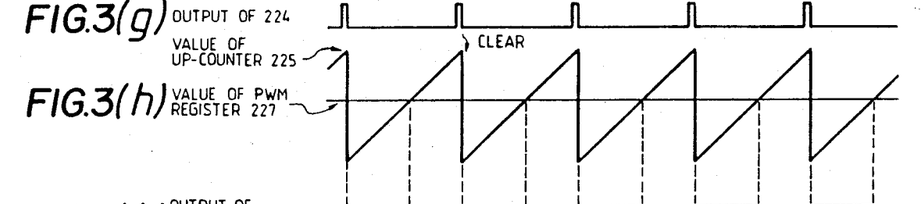

The reference numeral 224 denotes an AND circuit which receives as inputs the output of the flip-flop 221 and the output of the flip-flop 222 through an inverter 223, and outputs the signal of FIG. 3(e).

Figure 3I:
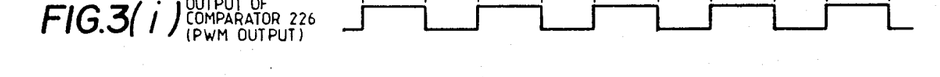

The reference numeral 225 designates an up counter which counts in synchronism with the system clock from the line 300a and is cleared by the signal of the AND circuit 224. The reference numeral 227 denotes a register circuit which receives as an input a data signal on a line 300b from the system bus of the microprocessor 300. The data signal on a line 300b is a signal for varying the pulse width (duty ratio) of the output pulse of the pulse modulator 2, and the pulse width thereof is varied by a signal written into the register 227. The reference numeral 226 designates a comparator which receives as inputs the signal of the up counter 225 and the signal of the register 227 and compares these signals, and outputs a high level signal when the signal of the register 227 is greater, and outputs a low level signal when the signal of the up counter 225 is greater. The output wave form of the comparator 226 is shown in FIG. 3(i). The output signal (PWM output) of this comparator 226 provides the output signal of the pulse generator means 22.

Figure 3J:
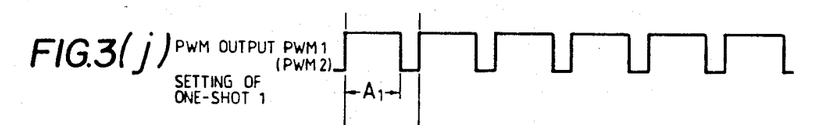
Figure 3K:
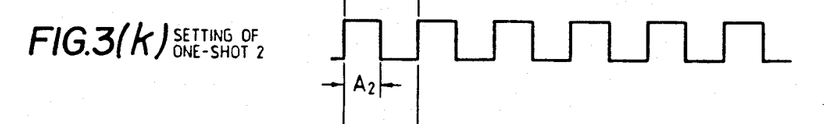
Figure 3L:
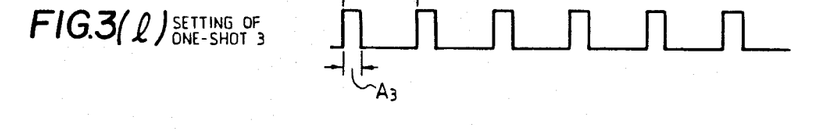

FIGS. 3(j)–(l) show examples of the wave form in which the setting of the pulse width for a clock pulse (f) has been changed by the data signal on the line 300b, and the ON state is varied as shown by $A_1$, $A_2$ and $A_3$. This PWM output is input to the bases of transistors Tr5 and Tr10 through resistors R8 and R16. The collectors of the transistors Tr5 and Tr10 are connected to the outputs of comparators IC1 and IC2, respectively, and the emitters thereof are connected to a common potential.

Consequently, when one PWM output PWM1 presents a high level, the transistor Tr5 conducts and the chopper transistor Tr1 becomes non-conductive. Conversely, when the PWM output PWM1 presents a low level, &he chopper transistor Tr1 is controlled by the output of the comparator IC1.

Transistor Tr10 in the II and IV phase side driving circuit corresponds to Tr5, and resistor R16 corresponds to R8. In the present embodiment, the outputs PWM1 and PWM2 of the PWM control unit are equal to each other.

The operation in the above-described construction will now be described in detail with reference to FIG. 4.

The chopper transistor Tr1 becomes nonconductive in response to the output PWM1 of the PWM control unit assuming a high level. Accordingly, when I phase magnetizing signal $\phi 1$ comes, I phase current $i_{\phi 1}$ rises, but in a section wherein PWM1 is at a high level, the I phase current begins to fall, and as PWM1 assumes a low level, the I phase current rises again. Thus, the I phase current $i_{\phi 1}$ rises in the form of a sawtooth wave, and the manner of rising thereof can be controlled by the duty of the PWM output.

Figure 4A:
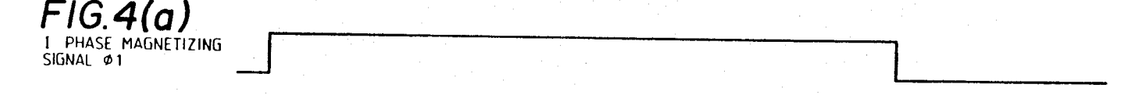
Figure 4B:
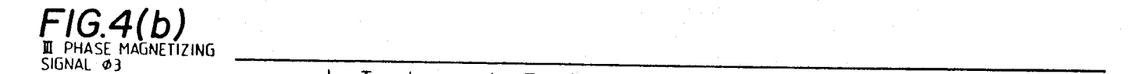
Figure 4C:
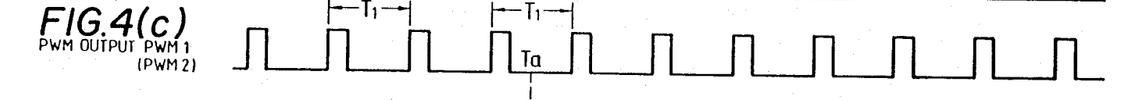
Figures 4D, 4E:
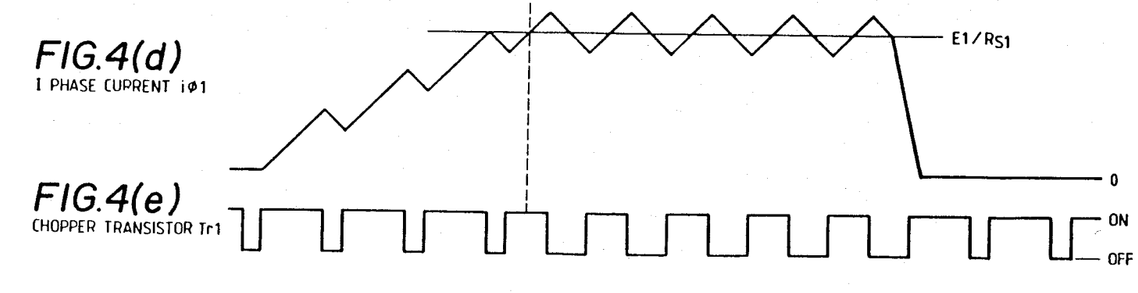

Also, after the I phase current $i_{\phi 1}$ reaches the level of the threshold value $E1/R_{S1}$ of the comparator IC1, the chopper transistor Tr1 becomes non-conductive in both of the section in which the PWM output PWM1 is at a high level and the section in which the I phase current $i_{\phi 1}$ exceeds the level of $E1/RS_1$ and the output of the comparator IC1 assumes a low level and therefore, switching of the chopper transistor Tr1 becomes synchronous with the period $T_1$ of the PWM output PWM1. In FIG. 4, at the timing Ta during the time $T_1$ in the output of PWM1, the output of the comparator IC1 exceeds 1 in the course of rising of the I phase current i$_{\phi 1}$, whereby the chopper transistors Tr2 and Tr1 become OFF. The output wave form of the chopper transistor Tr1 shown in FIG. 4(e) is also inverted from ON to OFF, but as shown in FIG. 4(e), a delay of timing is caused by the delay in response from OFF to ON of the comparator IC1, from ON to OFF of the transistor Tr2 and from ON to OFF of the transistor Tr1.

In the aforedescribed embodiment, the PWM outputs PWM1 and PWM2 are identical to each other and therefore, when magnetizing signals $\phi 1$ and $\phi 2$ are coming at a time as when the stepping motor SM is two-phase-driven, the turn-off of the transistor Tr1 and the turn-off of the transistor Tr6 take place at the same time.

Figure 5:
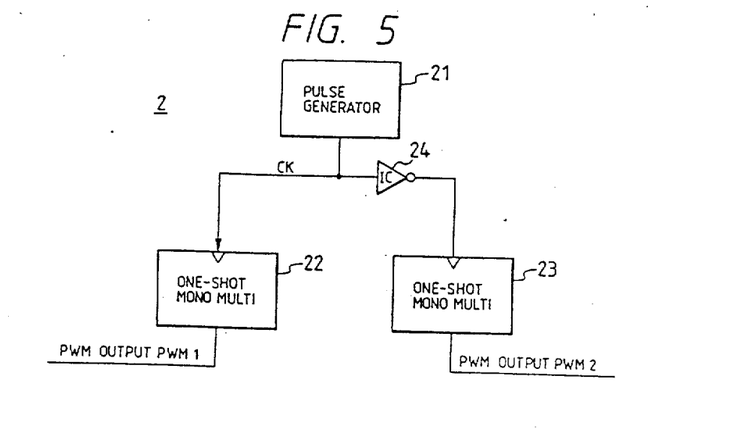
FIG. 5 is a block diagram showing another embodiment of the present invention.

So, in an embodiment shown in FIG. 5, PWM outputs PWM1 and PWM2 are generated independently of each other. That is, a one-shot monomulti is prepared for FIG. 2 also, and the output clock pulse CK of the pulse generator is triggered through an inverter IC24. This output is the PWM output PWM2.

Thus, if the clock pulse CK is a square wave of duty 50%, the PWM outputs PWM1 and PWM2 are 180° out of phase with each other, and the turn-off of the transistor Tr1 and the turn-off of the transistor Tr6 can be effected with a deviation of 180° therebetween. As a result, it becomes possible to reduce the momentary load of the power source.

As described above, according to the present invention, the turn-off-and-on of the chopper transistors in the constant current chopper driving circuit of the stepping motor is controlled by the PWM outputs and therefore, it becomes possible to control the rising of the phase current by the duty of PWM, and a stepping motor driving circuit of low noise can be provided by reducing the torque ripple of phase change-over.

Also, the chopper frequency is synchronized with the PWM frequency and therefore, there can be provided a stepping motor driving device in which the chopper frequency does not enter into the audible range to cause discordant noise.

I claim:

1. A stepping motor driving device for supplying electric power to a coil of each phase, comprising:
   means for producing a phase signal for exciting the supply of electric power to said coil of each phase;
   coil driving means for effecting the supply of electric power to said coil by the signal of said phase signal producing means;
   phase current detecting means for producing a signal corresponding to phase current in said coil;
   means for producing a reference signal;
   means for controlling the supply of electric power to said coil, said means including:
   means for comparing said reference signal with the signal from said phase current detecting means; and
   control means responsive to the signal of said comparing means to control the supply of electric power to said coil; and
   pulse generator means for generating a variable width pulse of a predetermined period, said pulse generator means being connected to said means for controlling the supply of electric power to said coil and controlling the operation time of said control means;
   said pulse generator means being connected to a processor for producing a data signal for varying said variable width pulse, and said variable width pulse generator means including means for controlling the pulse width of a clock signal from said processor to a pulse width corresponding to the variable width, and means for comparing said data signal with the signal of said pulse width control means.

2. A control circuit for controlling a stepping motor, comprising:
   a coil energizing means for generating a current to be supplied to a coil of a stepping motor;
   a chopper circuit connected to said coil and said coil energizing means;
   a comparator for operating said chopper circuit on the basis of a reference voltage signal and an input signal from a detecting means which is connected to said coil energizing means; and
   a pulse modulator connected to said chopper circuit for outputting a pulse signal having a predetermined width of pulse at a predetermined frequency, said pulse modulator forming a predetermined time period in which the current supply from said chopper circuit to said coil is forcibly prohibited by controlling an output of said chopper circuit.

3. A driving circuit according to claim 2, wherein said pulse modulator generates a plurality of pulses out of phase with each other in association with the number of phases of said stepping motor.

* * * * *

UNITED STATES PATENT AND TRADEMARK OFFICE
CERTIFICATE OF CORRECTION

PATENT NO. : 4,959,601

DATED : September 25, 1990

INVENTOR(S) : Noriyuki Kikugawa

It is certified that error appears in the above-identified patent and that said Letters Patent is hereby corrected as shown below:

TITLE PAGE:
[56] At References Cited:
U.S. Patent Documents
"Marimko" should read --Marinko--.

FIGS 5 and 6:
Add the sheet of drawings comprising Figures 5 and 6, as shown on the attached sheet.

COLUMN 1:
Line 51, "digital to analog converter," should read --(digital to analog) converter,--.

COLUMN 2:
Line 12, "flow" should read --flows--.
Line 36, "$L_1$" should read --$R_{s1}$--.

COLUMN 3:
Line 14, "FIGS. 3(a)-3()" should read --FIGS 3(a)-3(l)--.
Line 23, "FIGS. 8(a)-7(d)" should read --FIGS. 7(a)-7(d)--.

UNITED STATES PATENT AND TRADEMARK OFFICE
CERTIFICATE OF CORRECTION

PATENT NO. : 4,959,601

DATED : September 25, 1990

INVENTOR(S) : Noriyuki Kikugawa

It is certified that error appears in the above-identified patent and that said Letters Patent is hereby corrected as shown below:

COLUMN 4:
   Line 39, "&he" should read --the--.

COLUMN 5:
   Line 14, delete "at a time as".

COLUMN 6:
   Line 46, "driving circuit" should read --control circuit--.

Signed and Sealed this

Fourteenth Day of July, 1992

Attest:

DOUGLAS B. COMER

Attesting Officer          Acting Commissioner of Patents and Trademarks

FIG. 5

FIG. 6 PRIOR ART